USO11357048B2

(12) United States Patent
Huang et al.

(10) Patent No.: US 11,357,048 B2
(45) Date of Patent: Jun. 7, 2022

(54) NETWORK ALLOCATION VECTOR SETTINGS FOR MULTI-USER OPERATION

(71) Applicant: Intel Corporation, Santa Clara, CA (US)

(72) Inventors: Po-Kai Huang, San Jose, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 16/835,951

(22) Filed: Mar. 31, 2020

(65) Prior Publication Data

US 2020/0229233 A1 Jul. 16, 2020

Related U.S. Application Data

(63) Continuation of application No. 16/224,183, filed on Dec. 18, 2018, now Pat. No. 10,609,732, which is a continuation of application No. 15/200,448, filed on Jul. 1, 2016, now Pat. No. 10,200,989.

(60) Provisional application No. 62/278,010, filed on Jan. 13, 2016.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ............................ H04W 74/0816; H04W 84/12
See application file for complete search history.

(56) References Cited

U.S. PATENT DOCUMENTS

| 10,200,989 | B2 | 2/2019 | Huang et al. |
| 10,321,485 | B1 | 6/2019 | Noh et al. |
| 10,609,732 | B2 | 3/2020 | Huang et al. |
| 2011/0261708 | A1 | 10/2011 | Grandhi |
| 2016/0315681 | A1 | 10/2016 | Moon et al. |
| 2017/0094685 | A1* | 3/2017 | Noh .................... H04W 72/042 |
| 2017/0127352 | A1 | 5/2017 | Park et al. |

(Continued)

OTHER PUBLICATIONS

"U.S. Appl. No. 15/200,448, Examiner Interview Summary dated Jul. 18, 2018", 3 pgs.
"U.S. Appl. No. 15/200,448, Non Final Office Action dated Apr. 10, 2018", 26 pgs.
"U.S. Appl. No. 15/200,448, Non Final Office Action dated May 22, 2018", 25 pgs.

(Continued)

*Primary Examiner* — Will W Lin
(74) *Attorney, Agent, or Firm* — Schwegman Lundberg & Woessner, P.A.

(57) ABSTRACT

Methods, computer readable media, and wireless apparatuses are disclosed for setting network allocation vectors (NAV) for multi-user (MU) operation. An apparatus of a wireless device is disclosed. The apparatus comprising processing circuitry configured to: decode a preamble portion of a frame, and if the preamble portion of the frame comprises a high-efficiency (HE) signal (SIG) A field (HE-SIG-A) comprising a transmission opportunity (TXOP) duration field and a media access control (MAC) portion of the frame is not decoded, set one or more NAVs based on the TXOP duration field. The processing circuitry may be further configured to: decode a MAC portion of the frame, and if the MAC portion of the frame comprises a MAC duration field, set the one or more NAVs based on the MAC duration field.

18 Claims, 10 Drawing Sheets

(56) References Cited

U.S. PATENT DOCUMENTS

| | | | |
|---|---|---|---|
| 2017/0142659 A1* | 5/2017 | Noh | H04L 27/0006 |
| 2017/0201305 A1 | 7/2017 | Moon et al. | |
| 2017/0201981 A1 | 7/2017 | Huang et al. | |
| 2017/0295560 A1 | 10/2017 | Kim et al. | |
| 2018/0063824 A1 | 3/2018 | Kim et al. | |
| 2018/0249501 A1 | 8/2018 | Ko et al. | |
| 2018/0302858 A1 | 10/2018 | Son et al. | |
| 2018/0310330 A1 | 10/2018 | Chun et al. | |
| 2018/0324859 A1* | 11/2018 | Kim | H04W 74/0816 |
| 2019/0254070 A1 | 8/2019 | Huang et al. | |
| 2019/0261419 A1 | 8/2019 | Noh et al. | |

OTHER PUBLICATIONS

"U.S. Appl. No. 15/200,448, Notice of Allowance dated Sep. 19, 2018", 12 pgs.

"U.S. Appl. No. 15/200,448, Response filed Aug. 22, 2018 to Non Final Office Action dated May 22, 2018", 12 pgs.

"U.S. Appl. No. 16/224,183, Examiner Interview Summary dated Nov. 1, 2019", 3 pgs.

"U.S. Appl. No. 16/224,183, Non Final Office Action dated Aug. 20, 2019", 6 pgs.

"U.S. Appl. No. 16/224,183, Notice of Allowance dated Nov. 26, 2019", 13 pgs.

"U.S. Appl. No. 16/224,183, Preliminary Amendment filed May 3, 2019", 9 pgs.

"U.S. Appl. No. 16/224,183, Response filed Nov. 14, 2019 to Non-Final Office Action dated Aug. 20, 2019", 9 pgs.

* cited by examiner

NETWORK ALLOCATION VECTOR SETTINGS FOR MULTI-USER OPERATION

PRIORITY CLAIM

This application is a continuation of U.S. patent application Ser. No. 16/224,183, filed Dec. 18, 2018, now issued as U.S. Pat. No. 10,609,732 which is a continuation of U.S. patent application Ser. No. 15/200,448, field Jul. 1, 2016, now issued as U.S. Pat. No. 10,200,989, which claims the benefit of priority under 35 USC 119(e) to U.S. Provisional Patent Application Ser. No. 62/278,010, filed Jan. 13, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for network allocation vectors (NAVs) settings for multi-user operation.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
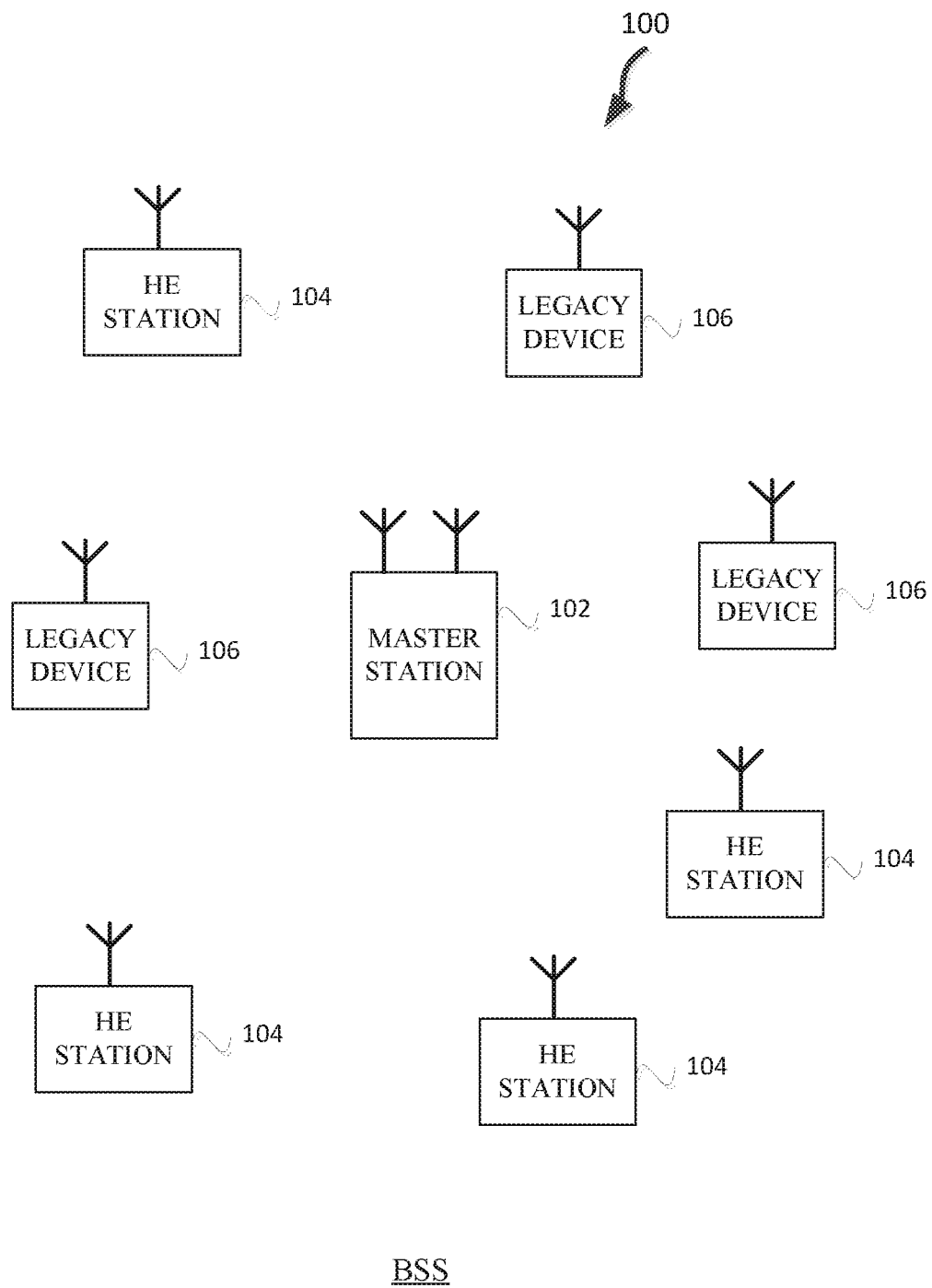
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20

MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-10.

Figure 2:
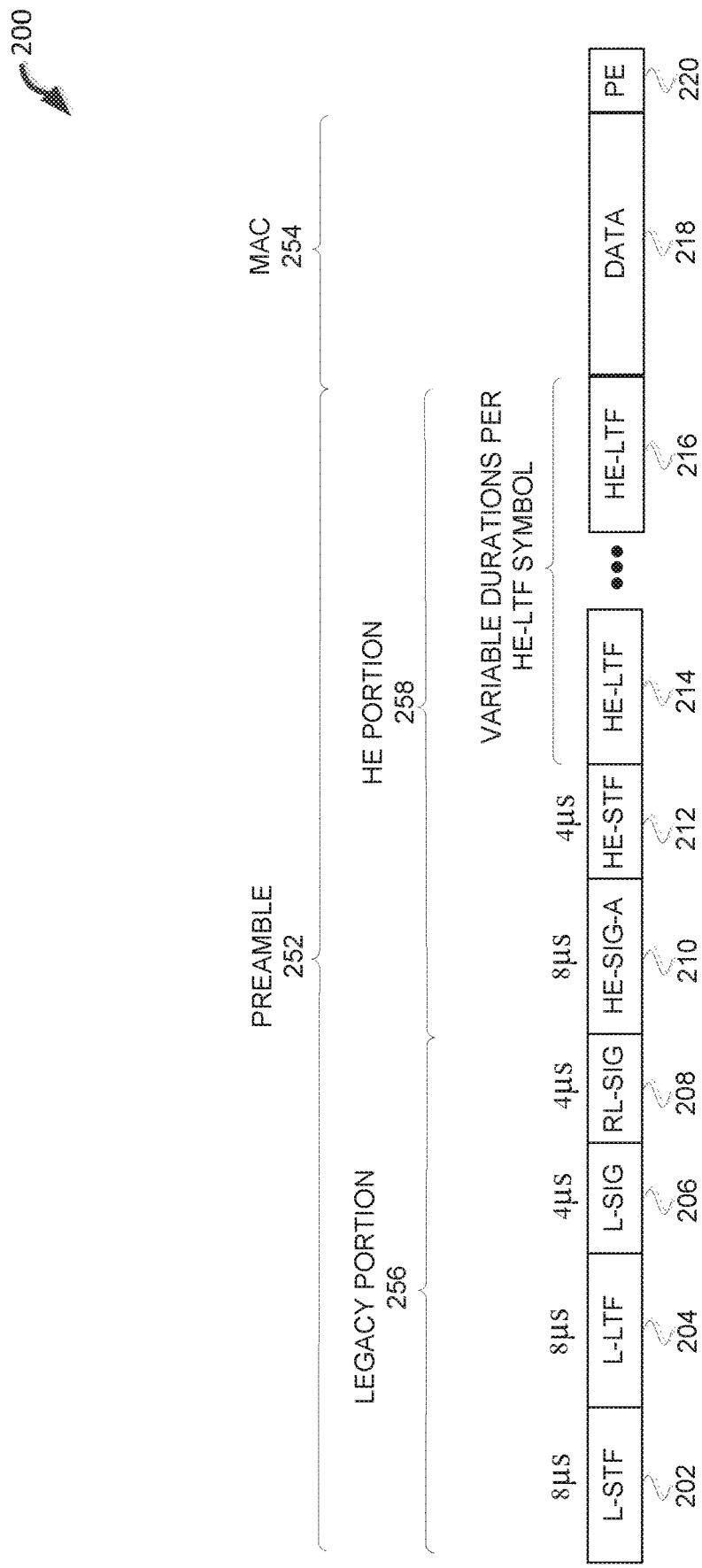
FIG. 2 illustrates a HE physical-layer convergence procedure (PLCP) protocol data unit (PPDU) in accordance with some embodiments.

FIG. 2 illustrates a HE physical-layer convergence procedure (PLCP) protocol data unit (PPDU) 200 in accordance with some embodiments. The HE PPDU 200 may be a HE single user (SU) PPDU format. The HE PPDU 200 may include a preamble 252 and a MAC 254. The preamble 252 may include a legacy portion 256 and a HE portion 258. The legacy portion 256 may include a legacy short training field (L-STF) 202, a legacy long training field (L-LTF) 204, a legacy signal field (L-SIG) 206, which may be modified for HE, and a repeated L-SIG (RL-SIG) 208. The HE portion may include a first high-efficiency (HE) signal field (HE-SIG-A) 210, a HE short training field (HE-STF) 212, and one or more HE long-training fields SIG (HE-LTFs) 214 through HE-LTF 216, which may have variable durations per HE-LTF symbol. The HE-SIG-A 210 field may include a transmission opportunity (TXOP) duration. The TXOP duration may be 7 bits. Data 218 may include a MAC 254 portion of the PPDU 200. The MAC 254 portion may be a physical layer service data unit (PSDU). The packet extension (PE) 220 may be an extension of the PPDU 200, e.g. for pre-forward error correction (FEC) padding boundaries.

Figure 3:
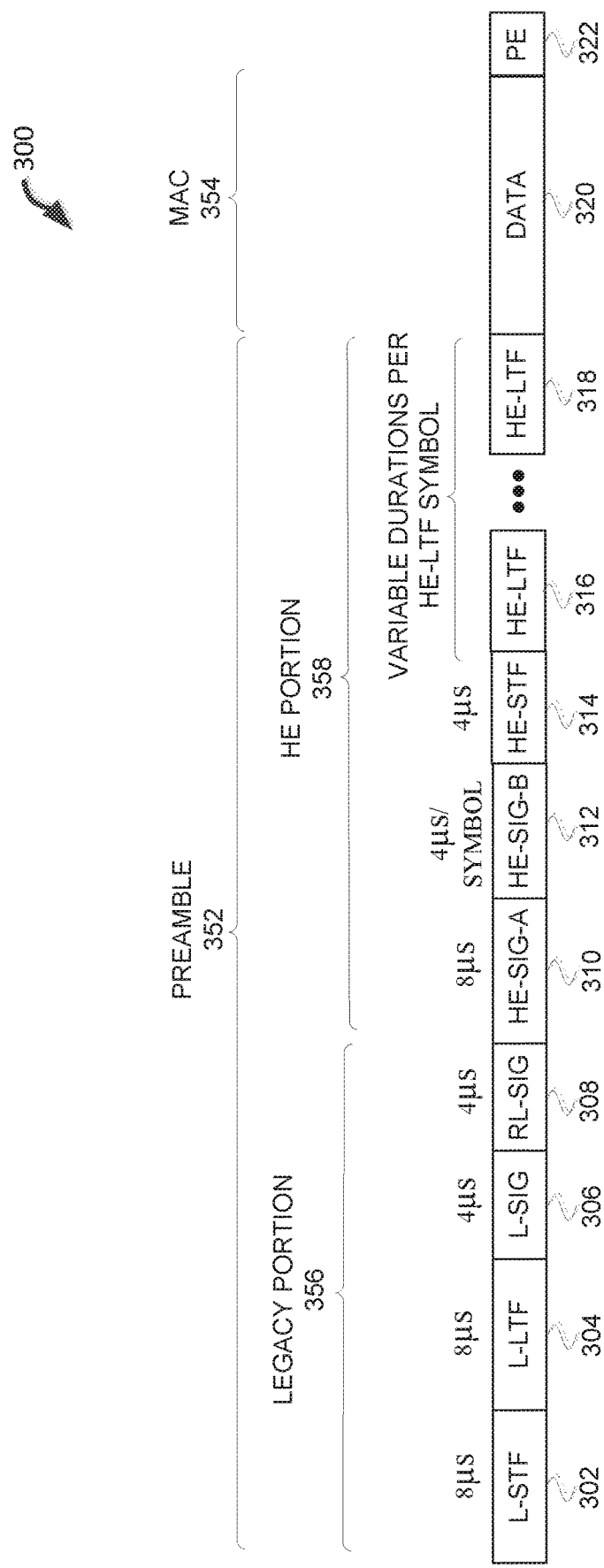
FIG. 3 illustrates a HE PPDU in accordance with some embodiments.

FIG. 3 illustrates a HE PPDU 300 in accordance with some embodiments. The HE PPDU 300 may be a HE multi user (MU) PPDU format. The HE PPDU 300 may include a preamble 352 and a MAC 354. The preamble 352 may include a legacy portion 356 and a HE portion 358. The legacy portion 356 may include a L-STF 302, a L-LTF 304, a L-SIG 306, which may be modified for HE, and a repeated L-SIG (RL-SIG) 308. The HE portion may include a HE-SIG-A 310, a HE-SIG-B 312 field, a HE-STF 314, and one or more HE-LTFs 316 through HE-LTF 318, which may have variable durations per HE-LTF symbol. The HE-SIG-A 310 field may include a TXOP duration. The TXOP duration may be 7 bits. In some embodiments, the TXOP duration may be between 5 and 10 bits. The HE-SIG-B 312 field may include a downlink (DL) resource allocation for one or more HE stations 104, which may include identifications of one or more HEW stations 104. Data 320 may be a MAC 354 portion of the PPDU 300. The MAC 354 portion may be a PSDU. The PE 320 may be an extension of the PPDU 300, e.g. for pre-FEC padding boundaries.

Figure 4:
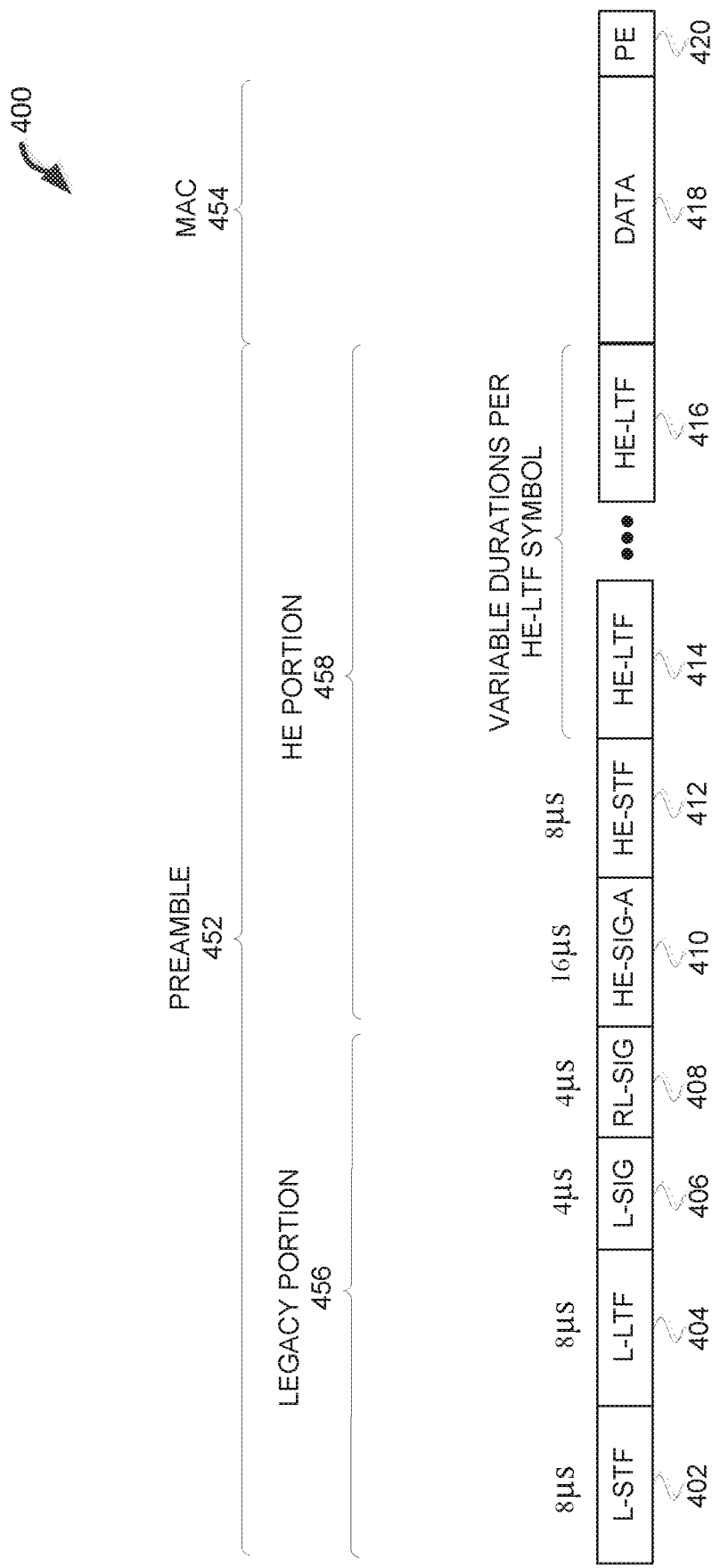
FIG. 4 illustrates a HE PPDU in accordance with some embodiments.

FIG. 4 illustrates a HE PPDU 400 in accordance with some embodiments. The HE PPDU 400 may be a HE extended range SU PPDU format. The HE PPDU 400 may include a preamble 452 and a MAC 454. The preamble 452 may include a legacy portion 456 and a HE portion 458. The legacy portion 456 may include a L-STF 402, a L-LTF 404, a L-SIG 406, which may be modified for HE, and a RL-SIG 408. The HE portion may include a HE-SIG-A 410, a HE-STF 412, and one or more HE-LTFs 414 through HE-LTF 416, which may have variable durations per HE-LTF symbol. The HE-SIG-A 410 field may include a TXOP duration. The TXOP duration may be 7 bits. In some embodiments, the TXOP duration may be between 5 and 10 bits. Data 418 may be a MAC 454 portion of the PPDU 400. The MAC 454 portion include a PSDU. The PE 420 may be an extension of the PPDU 400, e.g. for pre-FEC padding boundaries.

Figure 5:
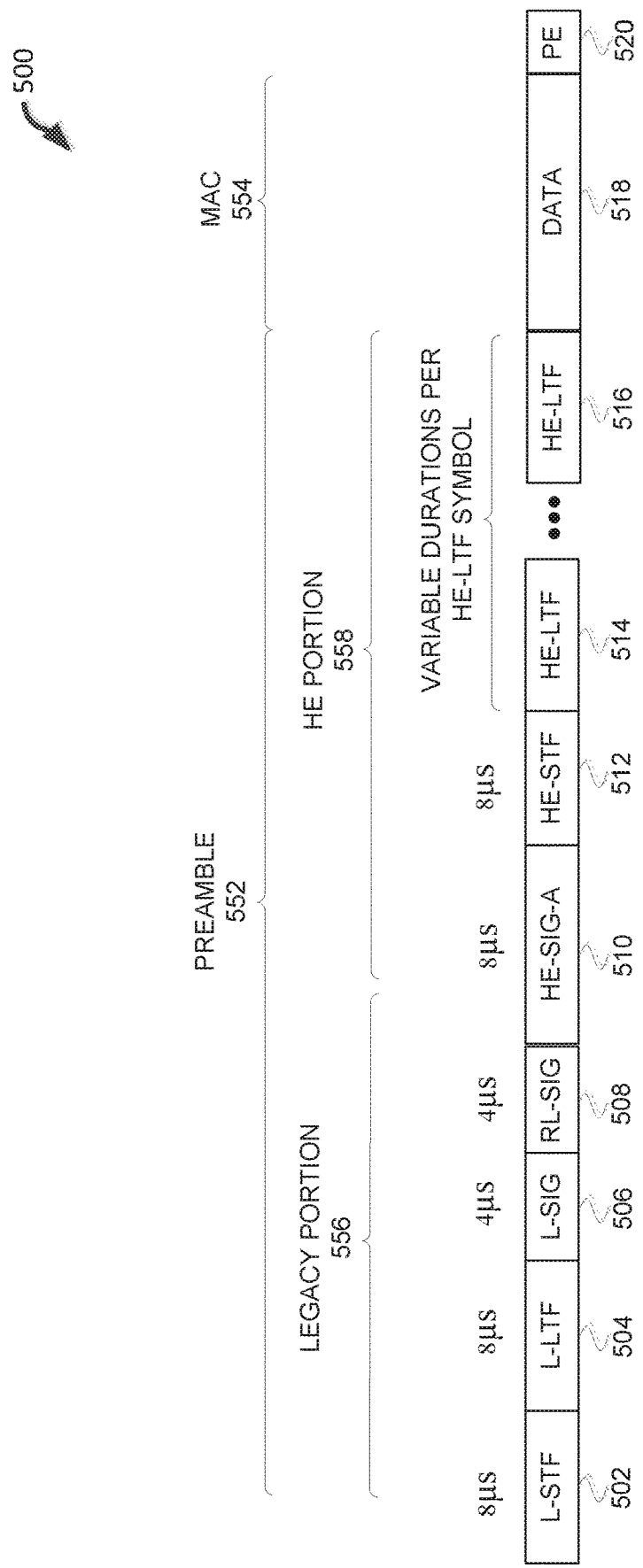
FIG. 5 illustrates a HE PPDU in accordance with some embodiments.

FIG. 5 illustrates a HE PPDU 500 in accordance with some embodiments. The HE PPDU 500 may be a HE trigger-based PPDU format. The HE PPDU 500 may include a preamble 552 and a MAC 554. The preamble 552 may include a legacy portion 556 and a HE portion 558. The legacy portion 556 may include a L-STF 502, a L-LTF 504, a L-SIG 506, which may be modified for HE, and a RL-SIG 508. The HE portion may include a HE-SIG-A 510, a HE-STF 512, and one or more HE-LTFs 514 through HE-LTF 516, which may have variable durations per HE-LTF symbol. The HE-SIG-A 510 field may include a TXOP duration. The TXOP duration may be 7 bits. In some embodiments, the TXOP duration may be between 5 and 10 bits. Data 518 may be a MAC 554 portion of the PPDU 500. The MAC 554 portion may be a PSDU. The PE 520 may be an extension of the PPDU 500, e.g. for pre-FEC padding boundaries.

Figure 6:
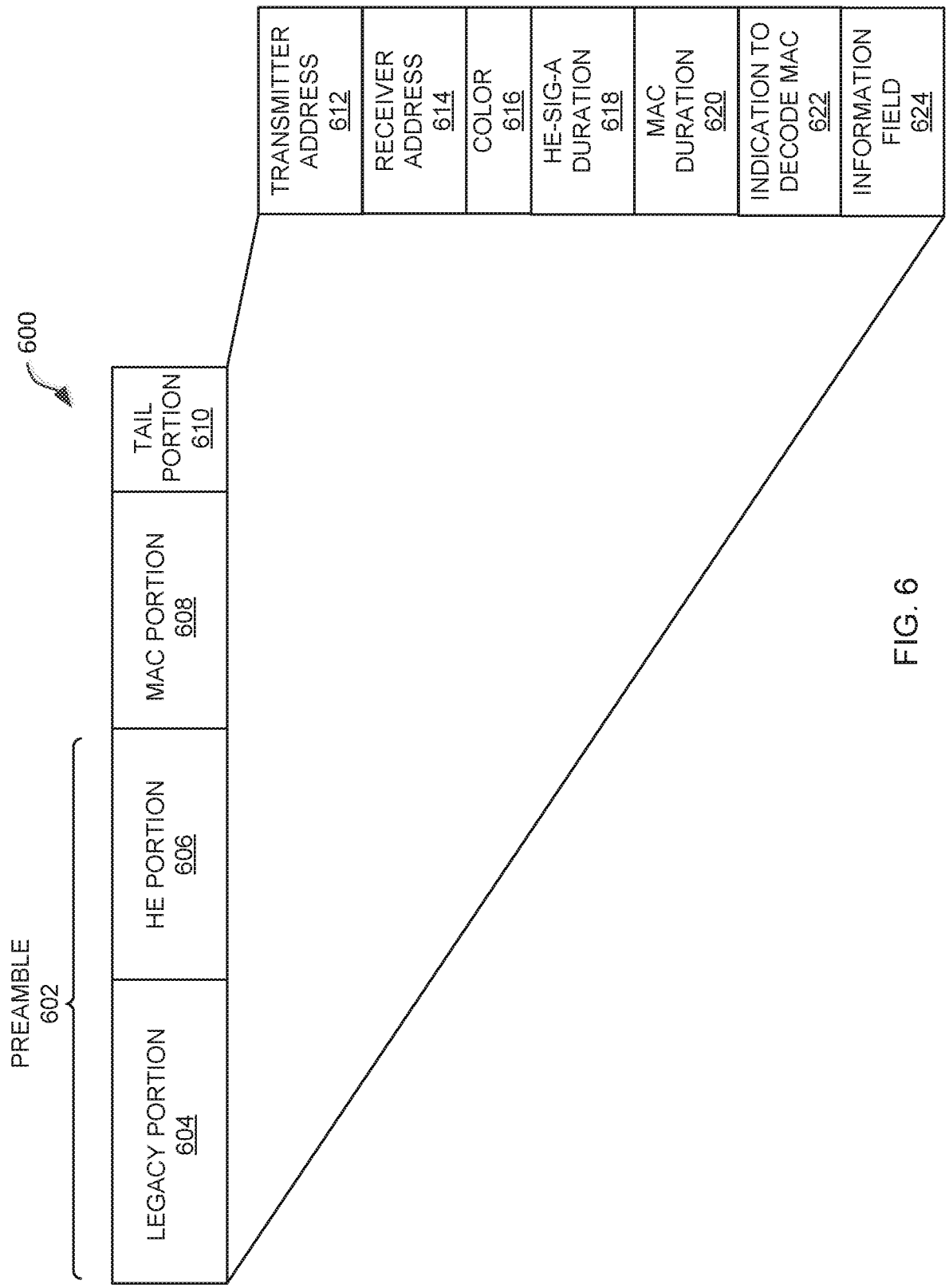
FIG. 6 illustrates a packet in accordance with some embodiments.

FIG. 6 illustrates a packet 600 in accordance with some embodiments. The packet 600 includes a legacy portion 604, HE portion 606, MAC portion 608, and tail portion 610. In some embodiments, the packet 600 may be HE PPDU 200 and/or a HE SU PPDU format. In some embodiments, the packet 600 may be HE PPDU 300 and/or a HE MU PPDU format. In some embodiments, the packet 600 may be a HE PPDU 400 and/or a HE extended range SU PPDU format. In some embodiments, the packet 600 may be HE PPDU 500 and/or a HE trigger-based PPDU format.

The packet 600 may include a transmitter address (TA) 612 field, receiver address (RA) field, color 616 field, HE-SIG-A duration 618 field, a MAC duration 620 field, an indication to decode MAC 622 field, and/or an information field 624. The TA 612 field may be part of the MAC portion 608 and may indicate a transmitter of the packet 600. The RA 614 field may be an intended receiver of the packet 600 address. The RA 614 field may be part of the MAC portion 608. The color 616 field may be an indication of a BSS. The color 616 field may be part of the HE portion 606 and/or the legacy portion 604. The HE-SIG-A duration 618 field may be a duration indicated in the HE portion 606. For example, the HE-SIG-A duration 618 field may be a 7 bit field in a HE-SIG-A field of the HE portion 606. For example, HE-SIG-A duration 618 field may be part of HE-SIG-A 210 field, HE-SIG-A 310 field, HE-SIG-A 410 field, or HE-SIG-A 510 field. The master station 102 and/or the HEW stations 104 may be configured to round up from an actual duration of the packet 600 or a TXOP. MAC duration 620 field may be a duration field in the MAC portion 608 of the packet 600. The MAC duration 620 field may be more bits than the HE-SIG-A duration 618 field. Because the MAC duration 620 field may be more bits, the MAC duration 620 field may be more accurate than the HE-SIG-A duration 618 field.

The HE-SIG-A 618 field may indicate a greater duration than the MAC duration 620 field because the HE station 104 and/or master station 102 may be configured to round up an actual duration due to the fewer bits of the HE-SIG-A duration 618 field compared with the MAC duration 620 field. For example, 7 bits for HE-SIG-A duration 618 field and 11 or 12 bits for the MAC duration 620. The indication to decode MAC 622 field may be an indication in the HE portion 606 that a HE station 104 and/or master station 102 should decode the MAC portion 608. For example, the indication to decode MAC 622 field may be an address indication of the HE station 104 and/or master station 102 that indicates there is a resource allocation and/or a request in the MAC portion 608 for the HE station 104 and/or master station 102 to UL or DL data. In some embodiments, the indication to decode MAC 622 may be indicated by a value of the color 616 field.

The information field 624 may be an indication of HE stations 104 that are to participate in a MU UL data. The information field 624 may be part of the preamble 602 and/or the MAC portion 608.

Figure 7:
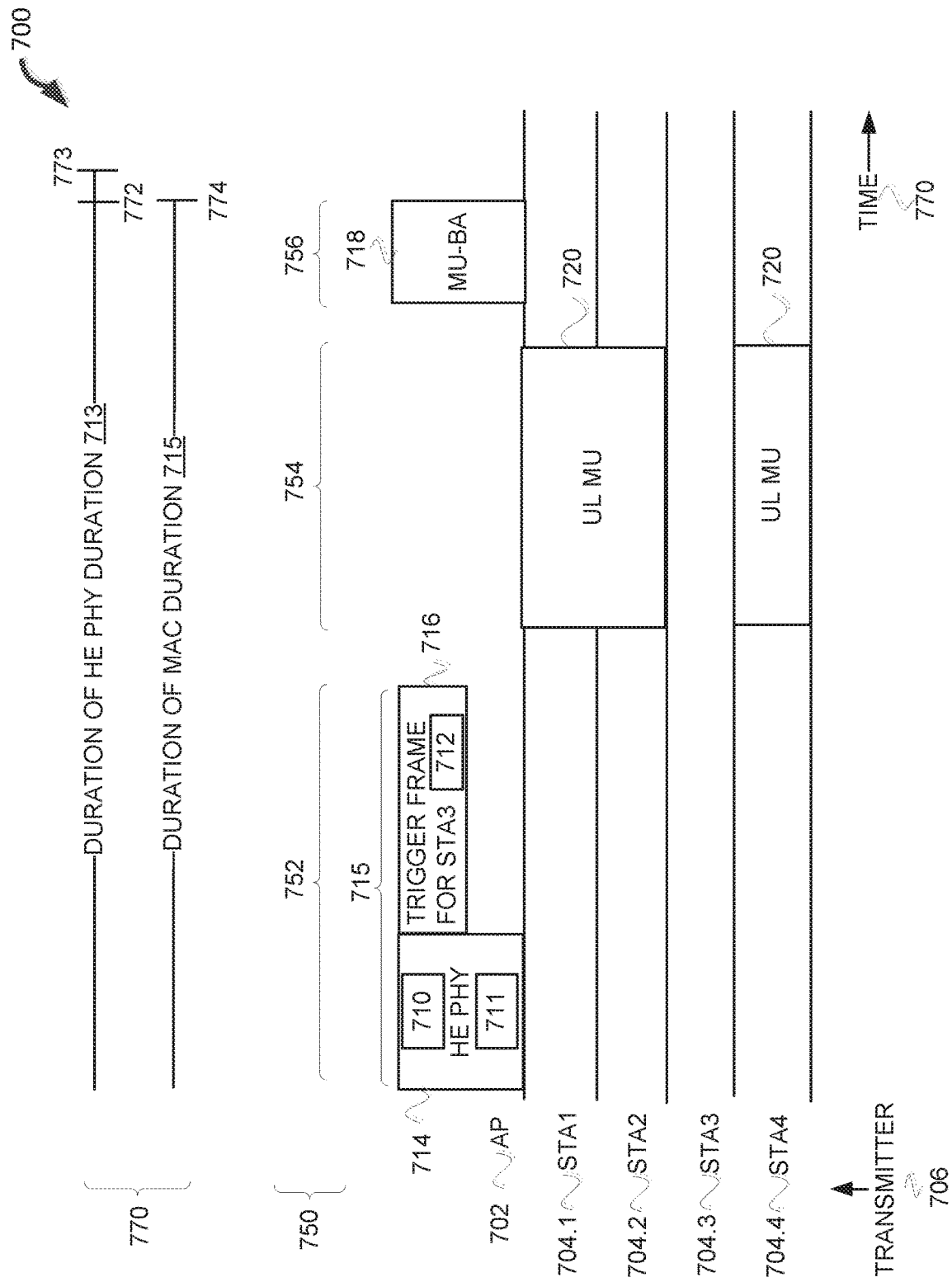
FIG. 7 illustrates a method of setting NAVs for MU operation in accordance with some embodiments.

FIG. 7 illustrates a method 700 of setting NAVs for MU operation in accordance with some embodiments. Illustrated in FIG. 7 is time 770 along a horizontal axis, transmitters 706 along a vertical axis, operations 750 along the top, and durations 760 along the top. The AP 702 may be a master station 102 and/or HEW station 104. The STAs 1, 2, 3, and 4, 704.1, 704.2, 704.3, and 704.4, respectively may be master stations 102 and/or HEW stations 104.

The method 700 begins at operation 752 with the AP 702 transmitting HE PHY 714. The HE PHY 714 is part of the frame 715. The frame 715 may include a HE PHY header portion (e.g., HE PHY 714) and a HE MAC portion (e.g., trigger frame for STA3 716). The MAC portion may be a PSDU. The frame 715 may be, for example, HE PPDU 200, 300, 400, or 500, or frame 600.

The HE PHY 714 may be received by STAs 704. The STAs 704 may be attached to the AP 702. The HE PHY 714 comprises a HE PHY duration 710 and an indication 711 of STA3 704.3. The HE PHY duration 710 may be indicated in a HE-SIG-B field. The HE PHY duration 710 may be TXOP duration, e.g. duration of HE PHY duration 713, which extends to time 772 or 773. The indication 711 field may be an indication in a HE-SIG-B field that STA3 704.3 should decode a MAC portion of the frame 715, e.g. it may indicate that STA3 704.3 is to receive a DL data and/or may receive a resource allocation for UL data. In some embodiments, indication 711 field is an information field 624. In some embodiments, STA3 704.3 will not set its NAV because of the indication 711 field.

Operation 752 continues with the AP 702 transmitting trigger frame for STA3 716. For example, trigger frame for STA3 716 may be the MAC portion 554 of a HE PPDU 500. The trigger frame for STA3 716 may be a PSDU. In some embodiments, STA3 704.3 may not receive the trigger frame for STA3 716. In some embodiments, STA3 704.3 will set its NAV to the duration 710 since it was not able to decode the trigger frame for STA3 716 even though trigger frame for STA3 716 was indicated in the HE PHY 714 by indication 711 field. The trigger frame for STA3 716 may include a MAC duration 712 field, which may have more bits than the HE PHY duration 710 field. The MAC duration 712 field may be different than the HE PHY duration 710 field because the HE PHY duration 710 field may use fewer bits to represent the duration, and the HE PHY duration 710 field may round up. For example, duration of HE PHY duration 713 (e.g., duration of the HE PHY 714 field) may extend to time 773 and duration of MAC duration 715 (e.g., duration of the MAC duration 712 field) may only extend to time 774. The HE PHY duration 710 and MAC duration 712 may extend to the same time 772 and 774 depending on how the HE PHY 773 rounds up the duration and depending on the actual duration (e.g., to time 774 or 772).

The method 700 continues at operation 754 with STAs 1, 2, 4, 704.1, 704.2, and 702.4, respectively, transmitting UL MU 720 to the AP 702. Each of STA1 704.1, STA2 704.2, and STA4 704.4 received a resource allocation in the frame 715. STA3 704.3 does not transmit in the UL MU 720 because it was unable to decode the MAC portion (trigger frame for STA3 716).

The method 700 continues at operation 756 with the AP 702 transmitting MU-block acknowledgement (MU-BA) 718. The AP 702 sends MU-BA 718 to STA 1, 2, 4, 704.1, 704.2, and 704.3, respectively. The method 700 may end, and the NAV of STA 3 704.3 may end at time 772. In some embodiments, if STA 3 704.3 decodes the trigger frame for STA3 716, then the STA 3 704.3 may receive a resource allocation for UL MU 720 and not set its NAV. In some embodiments, the HE PHY duration of 710 and/or MAC duration 712 may be longer to include addition operations.

Figure 8:
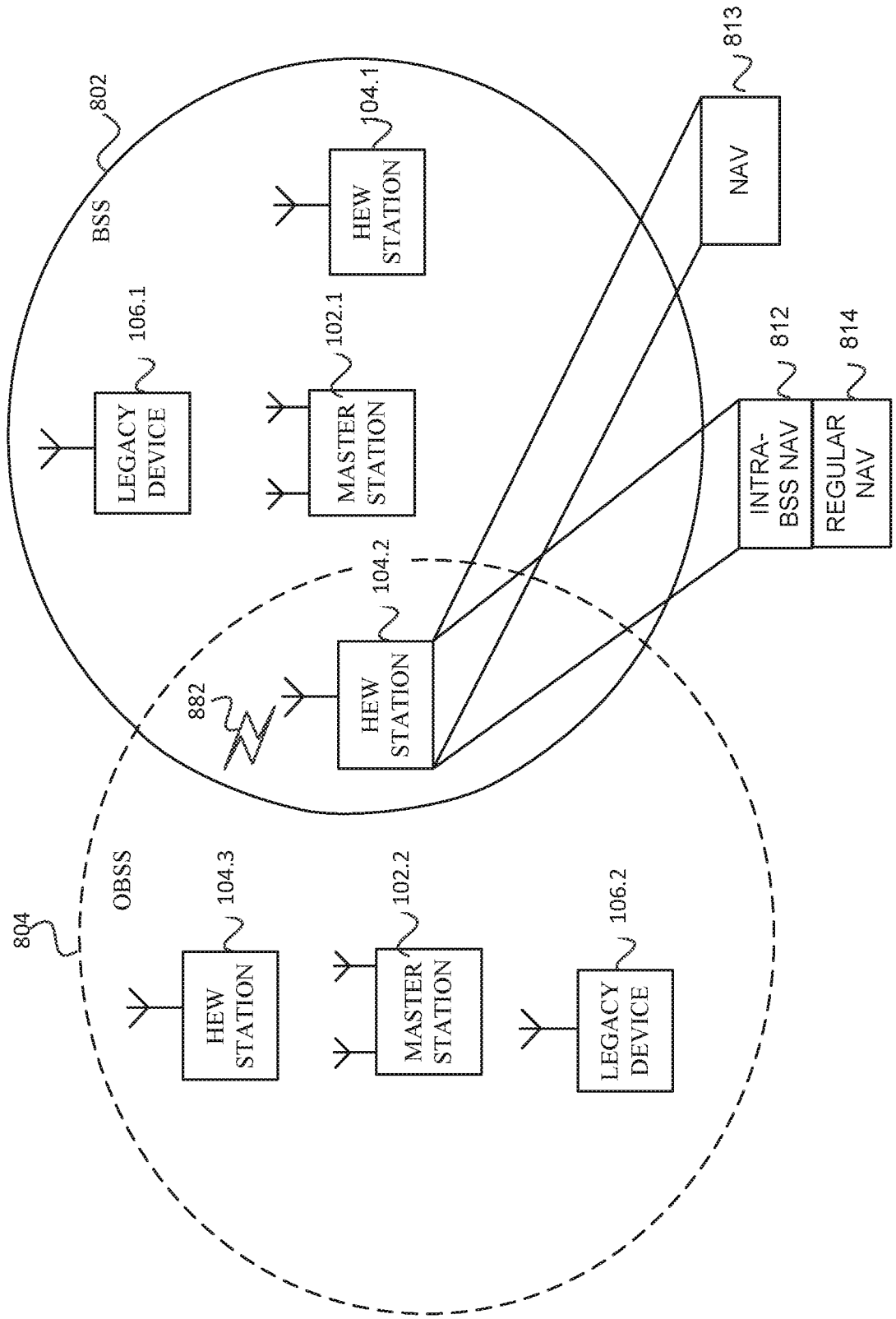
FIG. 8 illustrates setting NAVs for MU operation in accordance with some embodiments.

FIG. 8 illustrates setting NAVs for MU operation in accordance with some embodiments. Illustrated in FIG. 8 is the transmission range 802 of a BSS, the transmission range 804 of an overlapping BSS (OBSS), master stations 102, transmission 882, HEW stations 104, legacy devices 106, intra-BSS NAV 812 and regular NAVs 814. Master station 102.1 may be the master station 102.1 of transmission range 802 of BSS. Master station 102.2 may be the master station 102.2 of transmission range 804 of OBSS. Transmission 882 may be a frame from one of the legacy devices 106, master stations 102, or HEW stations 104, e.g. transmission 882 may be a packet 600, HE PPDU 200, a HE SU PPDU, HE PPDU 300, a HE MU PPDU, a HE PPDU 400, a HE extended range SU PPDU, MU-RTS, and/or a HE trigger-based PPDU. In some embodiments, the transmission 882 may be a legacy frame.

HEW station 104.1 and 104.2 may be attached to master station 102.1. HEW station 104.3 may be attached to master station 102.2. Legacy device 106.1 may be attached to master station 102.1. Legacy device 106.2 may be attached to master station 102.2.

HEW station 104.2 includes an intra-BSS NAV 812 and a regular NAV 814 in accordance with some embodiments. In some embodiments HEW station 104.2 includes only the NAV 813, which, in some embodiments is termed a regular NAV.

The HEW station 104.2 may be configured to associate with a mater station 102.1. The HEW station 104.2 may then decode a packet from the master station 102.1. The packet may include an address of the master station 102.1 (e.g., transmitter address 612) and/or a BSS color (e.g., color 616 field). The HEW station 104.2 may set a BSS identification (BSSID) as the address of the master station 102.1 and/or may store the BSS color. A transmission opportunity (TXOP) holder address may be the transmitter address 612.

The HEW station 104.2 is illustrated with two embodiments. An embodiment with an intra-BSS NAV 812 and regular NAV 814, which may be termed NAV in some embodiments, and an embodiment with one NAV 813, which in some embodiments is termed a regular NAV 814. The HEW station 104.2 may be configured to not contend if intra-BSS NAV 812 field value or regular NAV 814 field value has not expired (e.g., reached zero). The HEW station 104.2 may be configured to not contend if NAV 813 field value has not expired (e.g., reached zero) if the HEW station 104.2 includes only one NAV 813. In some embodiments, intra-BSS NAV 812 will not be considered for a response to UL MU for the HEW station 104.2. For example, the intra-BSS NAV 812 may be set and the HEW station 104.2 may receive a transmission 882 that is a trigger frame from the master station 102.1. The HEW station 104.2 would may then ignore the intra-BSS NAV 512 being set and respond in accordance with the resource allocation in the UL MU trigger frame.

In some embodiments, the HEW station 104.2 is configured to not use a HE-SIG-A duration 618 field value, if a MAC duration 620 field is successfully decoded. In some embodiments, the HEW station 104.2 is configured to only update the intra-BSS NAV 812, if a duration of a packet of the transmission 882 is greater than the intra-BSS NAV 812. In some embodiments, the HEW station 104.2 is configured to only update the regular NAV 814, if a duration of a packet of the transmission 882 is greater than the regular NAV 814.

In some embodiments, the HEW station 104.2 is configured to not set the NAV 813, if the transmission 882 is a HE PPDU 500 that is a HE trigger-based PPDU format (e.g., trigger frame or MU-RTS), and the HEW station 104.2 is identified in an information field 624 of the HE PPDU 500, and the HE station 104.2 has only the NAV 813. If the HE station 104.2 has both the regular NAV 814 and the intra-BSS NAV 812, and the HE station 104.2 is identified in an information field of the HE PPDU 500, then the HE station 104.2 updates the intra-BSS NAV 812 based on a MAC duration 620 of the HE PPDU 500, in accordance with some embodiments.

In some embodiments, the HE station 104.2 may have only NAV 813 and may be configured to update its NAV 813 based on a valid duration decoded from a MAC portion 608 of transmission 882 (e.g., MAC duration 620) of a packet 600. If the packet 600 receiver address 614 is the same as a MAC address of the HE station 104.2 then the HE station 104.2 does not update its regular NAV 814 (two NAV embodiment) or NAV 813 (one NAV embodiment). If the transmission 882 is a packet 600 that is a trigger frame or MU-RTS frame, e.g., HE PPDU 500 that is a HE trigger-based PPDU format, and the HE station 104.2 is identified in the HE trigger-based PPDU format for a resource allocation (e.g., for UL MU data), then the HE station 104.2 does not set its regular NAV 814 or intra-NAV 812 (two NAV embodiment) or NAV 813 (one NAV embodiment).

In some embodiments, the HE station 104.2 may have only NAV 813 and may be configured to not update its NAV 814 if the transmission 882 is a MU request-to-send (RTS) and the HE station 104.2 is indicated in an information field 624 that the HE station 104.2 is to participate in the MU-RTS.

In some embodiments, if the transmission 882 is a packet 600 of a type MU-RTS, then the HE station 104.2 does not set the intra-BSS NAV 812 or the regular NAV 814 or the NAV 813 in the single NAV embodiment, if the HE station 104.2 is indicated in an information field 624 of the packet 600.

If the HE station 104.2 does not decode a valid PSDU of a MAC portion 608 of a packet 600 (transmission 882), and the color 616 indicates an intra-BSS packet, then the HE station 104.2 updates NAV 813 if the received HE-SIG-A duration 618 field value (e.g., TXOP duration) is longer than the HE station 104.2 current NAV 813 field value. If the HE station 104.2 has both the regular NAV 812 and the intra-BSS NAV 814, then the HE station 104.2 updates the intra-BSS NAV 814 if the HE-SIG-A duration 618 field value (e.g., TXOP duration) is longer than the HE station 104.2 intra-BSS NAV 814 field value.

In some embodiments, the HE station 104.2 is configured as follows: if the HE station 104.2 receives a HE-SIG-A duration 618 (e.g., TXOP duration) from a packet 600, but does not decode or successfully decode a MAC portion 608 (e.g., PSDU) of the packet 600, and identifies the packet 600 as an intra-BSS packet, then the HE station 104.2 updates its intra-BSS NAV 812 with the HE-SIG-A duration (e.g, TXOP duration) 618, if the HE-SIG-A duration 618 is greater than the intra-BSS NAV 812 of the HE station 104.2 and the packet 600 is not a HE trigger based PPDU (e.g., HE PPDU 500) triggered by the HE station 104.2.

In some embodiments, the HE station 104.2 is configured as follows: if the HE station 104.2 does not decode the MAC portion 608 or does not decode a valid MAC duration 620 from a MAC portion 608 and the color 616 indicates an inter-BSS packet 600 (e.g., transmitted from master station 102.2), the HE station 104.2 updates the regular NAV 814

(for the two NAV embodiment) if the HE-SIG-B duration 618 is longer than the regular NAV 814. If the HE station 104.2 has NAV 813 (the one NAV embodiment), then the HE station 104.2 updates the NAV 813, if the HE-SIG-B duration 618 is longer than the NAV 813.

In some embodiments, the HE station 104.2 is configured as follows: if the HE station 104.2 does not decode the MAC portion 608 or does not decode a valid MAC duration 620 from a MAC portion 608 and the color 616 indicates an intra-BSS packet 600 (e.g., transmitted from master station 102.2), the HE station 104.2 updates the intra-BSS NAV 812 (for the two NAV embodiment) if the HE-SIG-B duration 618 is longer than the intra-BSS NAV 812. If the HE station 104.2 has NAV 813 (the one NAV embodiment), then the HE station 104.2 updates the NAV 813, if the HE-SIG-B duration 618 (e.g., TXOP duration) is longer than the NAV 813.

In some embodiments, the HE station 104.2 may be configured as follows: if the HE station 104.2 receives a packet 600 with a HE-SIG-B duration 618 and does not successfully decode a MAC portion 608, and identifies the packet 600 as an inter-BSS packet or cannot identify whether the packet 600 is an inter-BSS packet or intra-BSS packet, then the HE station 104.2 updates its regular NAV 814 with the information from the HE-SIG-B duration 618 if the HE-SIG-B duration 618 is greater than the regular NAV 814 of the HE station 104.2.

In some embodiments, the HE station 104.2 is configured to not set the regular NAV 814, if a received packet 600 is triggered by the HE station 104.2 sending a trigger frame (e.g., HE PPDU 500) to another HE station 104.

In some embodiments, the HE station 104.2 is configured as follows: if the HE station 104.2 does not decode a MAC portion 608 or does not decode a valid MAC duration 620 from a MAC portion 608 and the color 616 indicates an intra-BSS packet 600 (e.g., transmitted from master station 102.1), the HE station 104.2 updates the NAV 813 (in the case of an embodiment with one NAV) with a TXOP duration (e.g., HE-SIG-A duration 618), if the TXOP duration is greater than the NAV 813. In the case of the two NAV embodiment, the HE station 104.2 updates the intra-BSS NAV 812 if the TXOP duration is greater than the intra-BSS NAV 812.

In some embodiments, the HE station 104.2 is configured as follows: if the HE station 104.2 determines the transmission 882 is an inter BSS frame or an unclassified frame (the HE station 104.2 cannot determine whether it is intra-BSS frame or inter-BSS frame), and if the HE station 104.2 does not decode the MAC portion 608 or does not decode a valid MAC duration 620 from a MAC portion 608 and the HE station 104.2 is the two NAV embodiment with intra-BSS NAV 812 and regular NAV 814, then the HE station 104.2 updates the regular NAV 814 with the HE-SIG-B duration 618 if the HE-SIG-B duration 618 is longer than the regular NAV 814. If the HE station 104.2 has NAV 813 (the one NAV embodiment), then the HE station 104.2 updates the NAV 813, if the HE-SIG-B duration 618 (e.g., TXOP duration) is longer than the NAV 813.

In some embodiments, the HE station 104.2 is configured as follows: if the HE station 104.2 determines the transmission 882 is in response to a trigger frame or a MU-RTS transmitted by the HE station 104.2, then the HE station 104.2 does not set a NAV based on the transmission 882.

In some embodiments, the HE station 104.2 is configured as follows: if the HE station 104.2 does not decode a MAC portion 608 or does not decode a valid MAC duration 620 from a MAC portion 608, and a HE-SIG field comprises a TXOP duration field (e.g., HE-SIG-A duration 618), the HE station 104.2 is configured to set NAV 813 based on the TXOP duration (e.g., HE-SIG-A duration 618) or set one of intra-BSS NAV 812 or regular NAV 814 based on the TXOP duration (e.g. HE-SIG-A duration 618.)

Figure 9:
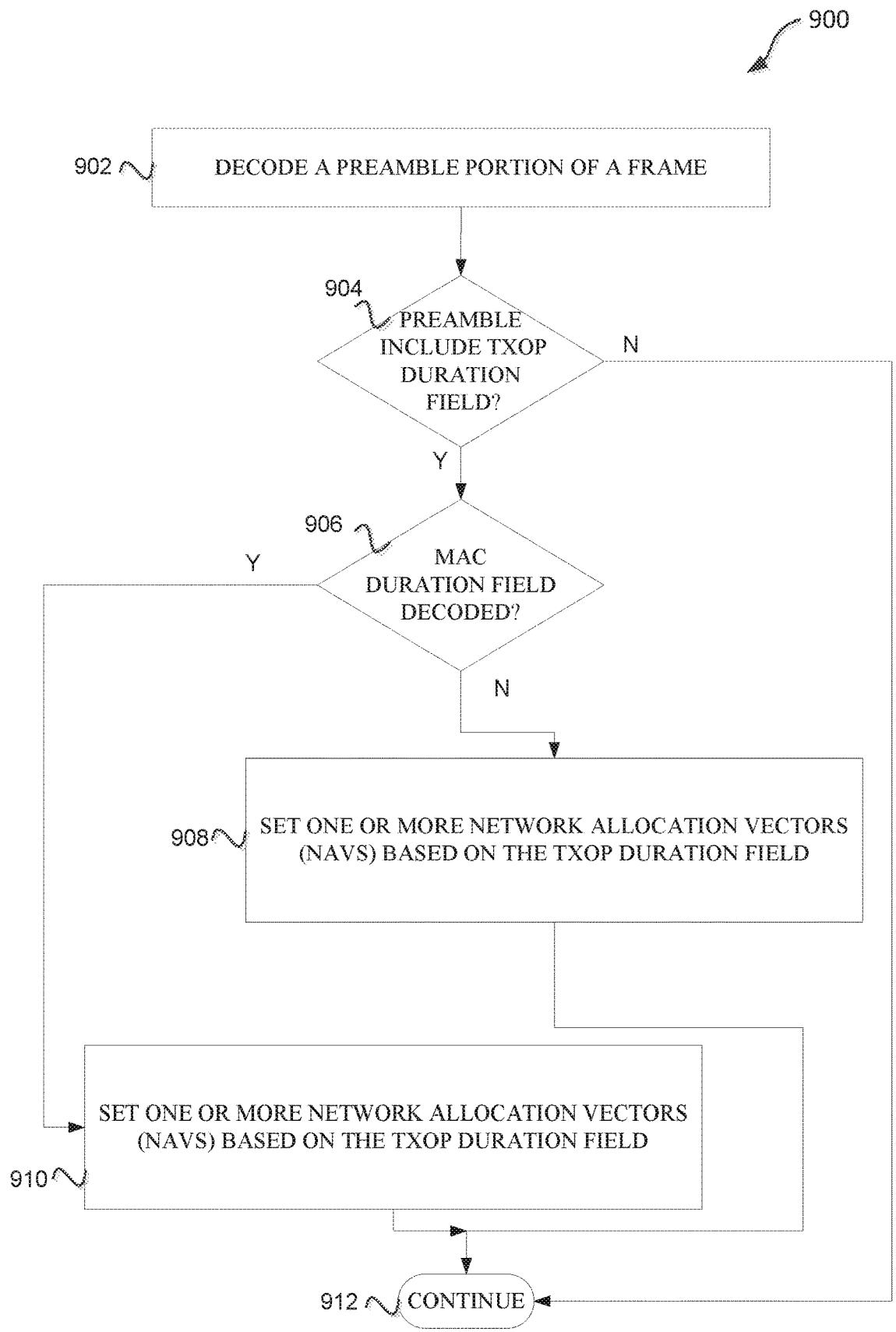
FIG. 9 illustrates a method of setting NAVs for MU operation in accordance with some embodiments.

FIG. 9 will be disclosed in conjunction with FIG. 8. FIG. 9 illustrates a method 900 of setting NAVs for MU operation in accordance with some embodiments.

The method 900 begins at operation 902 with decoding a preamble portion of a frame. For example, HEW station 104.2 may decode a preamble 252, 352, 452, 552, or 602.

The method 900 continues at operation 904 with determining if the preamble includes a TXOP duration field. For example, preamble 602 includes a HE-SIG-A duration 618 field. As another example, preambles 252, 352, 452, 552, or 602 may include a HE-SIG-A duration 618 field. Legacy frames (not illustrated) do not include a TXOP duration field.

If the preamble includes a TXOP duration field, then the method 900 continues at operation 906 with was a MAC duration field decoded. For example, HEW station 104.2 may receive a transmission 882 that is a packet such as packet 600, HE PPDU 200, HE PPDU 300, HE PPDU 400, or HE PPDU 500. The HEW station 104.2 may not receive an indication to decode MAC 622 or the HEW station 104.2 may attempt to decode the MAC 622 and fail. In some embodiments, if the HEW station 104.2 does receive the indication to decode MAC 622, then the HEW station 104.2 decodes the MAC portion, which may include a MAC duration 620.

If the MAC duration field was not decoded, then the method 900 continues at operation 908 with setting one or more network allocation vectors (NAVs) based on the TXOP duration field. For example, HEW station 104.2 may set intra-BSS NAV 812 or regular NAV 814 based on the TXOP duration field. The method 900 may continue with operation 912 with continue where additional operations may be performed.

Returning to operation 904, if the preamble does not include TXOP duration field, then the method 900 may continue to operation 912 continue where additional operation may be performed. For example, the HE station 104.2 may determine the packet is a legacy packet and determine a NAV or NAVs based on a duration in the legacy portion of the packet.

Returning to operation 906, if the MAC duration field is decoded, then the method 900 continues to operation 910 with set the one or more network allocation vectors (NAVs) based on the MAC duration field. For example, the HEW station 104.2 may have the indication to decode MAC 622, and the HEW station 104.2 may successfully decode a MAC 254, MAC 354, MAC 454, MAC 554, or MAC portion 608. The MAC portion 608 may include a MAC duration 620 and the HE station 104.2 may set a NAV or NAVs based on the MAC duration 620.

Figure 10:
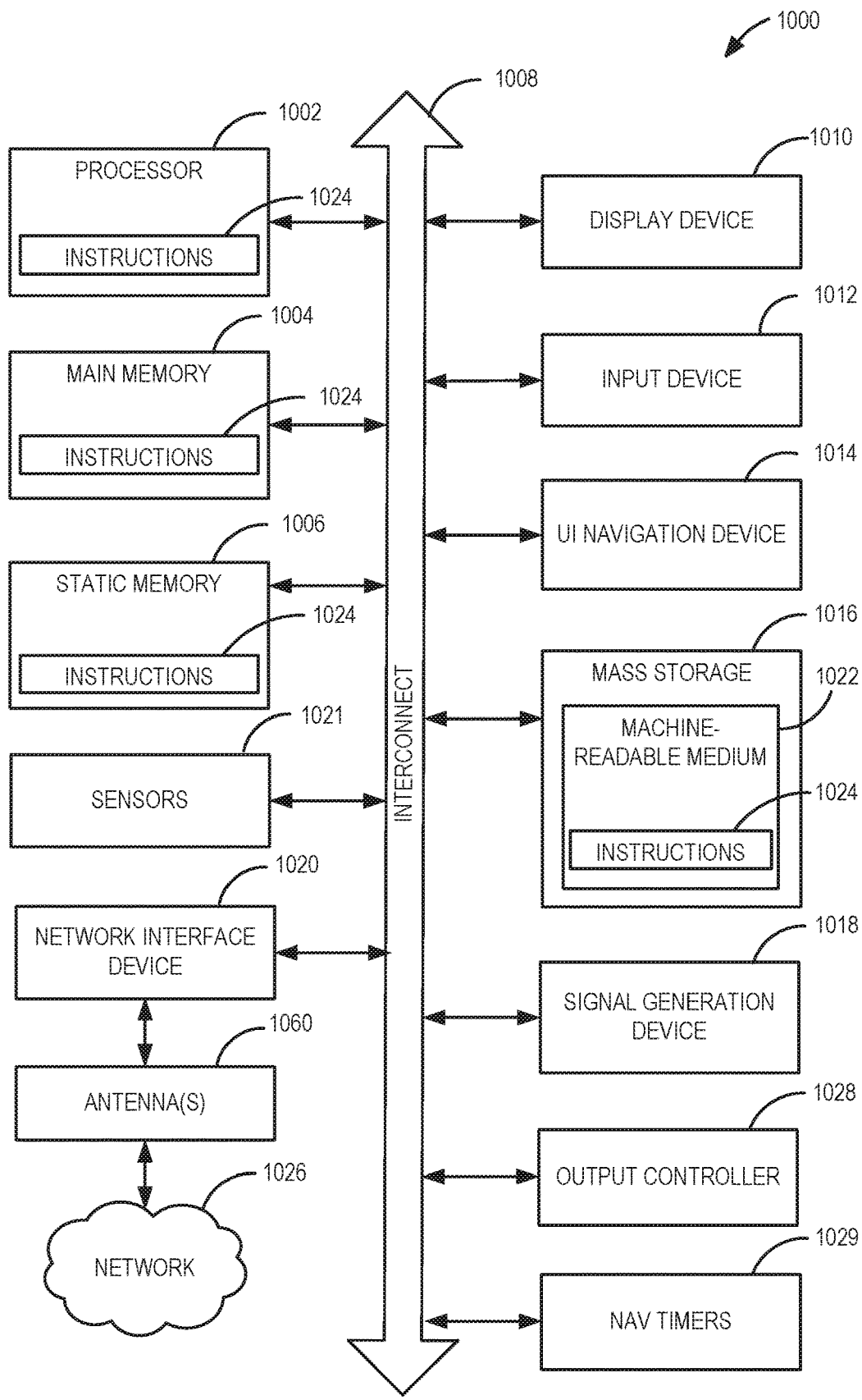
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display device 1010, an input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1002 and/or instructions 1024 may comprise processing circuitry and/or transceiver circuitry. The machine 1000 may further include NAV timers 1029. The NAV timers 1029 may be configured to operate as described herein in conjunction with FIGS. 7 and 8. In some embodiments, the NAV timers 1029 may be configured to generate an interrupt when NAV1 702 reaches zero.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

An apparatus of the machine 1000 may be one or more of a hardware processor 1002 (e.g., a central processing unit (CPU), a graphics processing unit (GPU), a hardware processor core, or any combination thereof), a main memory 1004, a static memory 1006, instructions 1024, display device 1010, input device 1012, UI navigation device 1014, mass storage 1016, signal generation 1018, output controller 1028, NAV timers 1029, sensors 1021, network interface device 1020, and antennas 1060 some or all of which may communicate with each other via an interlink (e.g., bus) 1008. One or more of the following of the apparatus of the machine 1000 may be separate from the machine 1000 and may be configured to work in conjunction with the machine 1000, be a portion or component of the machine 1000: a hardware processor (e.g., a central processing unit (CPU), a graphics processing unit (GPU), a hardware processor core, or any combination thereof), a main memory, a static memory, instructions, display device, input device, UI navigation device, mass storage, signal generation, output controller, NAV timers, sensors, network interface device, and antennas.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1020 may include one or more physical jacks (e.g., Ethernet, coaxial, or phone jacks) or one or more antennas to connect to the communications network 1026. In an example, the network interface device 1020 may include one or more antennas 1060 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device including: memory; and processing circuitry coupled to the memory, the processing circuitry configured to: decode a preamble portion of a frame; and if the preamble portion of the frame comprises a high-efficiency (HE) signal (SIG) A field (HE-SIG-A) including a transmission opportunity (TXOP) duration field, and a media access control (MAC) portion of the frame is not decoded, set one or more network allocation vectors (NAVs) based on the TXOP duration field.

In Example 2, the subject matter of Example 1 optionally includes where the processing circuitry is further configured to: if the MAC portion of the frame is decoded and the MAC portion comprises a MAC duration field, set the one or more NAVs based on the MAC duration field.

In Example 3, the subject matter of Example 2 optionally includes where the MAC portion is a physical layer convergence (PLCP) service data unit (PSDU).

In Example 4, the subject matter of any one or more of Examples 2-3 optionally include where the TXOP duration field comprises fewer bits than the MAC duration field.

In Example 5, the subject matter of any one or more of Examples 2-4 optionally include where the frame comprises a receiver address (RA), and where the processing circuitry is further configured to: refrain from setting the one or more NAVs if the RA is equal to a MAC address of the wireless device.

In Example 6, the subject matter of any one or more of Examples 1-5 optionally include where the processing circuitry is further configured to: if the frame is a trigger frame, and the wireless device is indicated in an information field of the trigger frame refrain from setting the one or more NAVs.

In Example 7, the subject matter of any one or more of Examples 1-6 optionally include where the processing circuitry is further configured to: if the frame is a multi-user (MU) request-to-send (RTS) frame, and the wireless device is indicated in an information field of the MU-RTS frame, refrain from setting the one or more NAVs.

In Example 8, the subject matter of any one or more of Examples 1-7 optionally include where the processing circuitry is further configured to: if a MAC portion of the frame is not decoded and a basic service set (BSS) color field of the frame indicates the frame is an intra-BSS frame, and if there is only one NAV, then update the only one NAV with the TXOP duration if the TXOP duration is greater than the only one NAV; and if there is more than one NAV, update an intra-BSS NAV of the one or more NAVs with the TXOP duration if the TXOP duration is greater than the intra-BSS NAV.

In Example 9, the subject matter of any one or more of Examples 1-8 optionally include where the processing circuitry is further configured to: if a MAC portion of the frame is not decoded, and the frame is a not in response to a trigger frame from the wireless device, and if a basic service set (BSS) color of the frame indicates the frame is an intra-BSS frame, and there is only one NAV, update the NAV with the TXOP duration if the TXOP duration is greater than the NAV; and if there is more than one NAV, update an intra-BSS NAV of the one or more NAVs with the TXOP duration if the TXOP duration is greater than the intra-BSS NAV.

In Example 10, the subject matter of any one or more of Examples 1-9 optionally include where the processing circuitry is further configured to: if a MAC portion of the frame is not decoded, and a basic service set (BSS) color of the frame indicates the frame is an inter-BSS frame, and if there is only one NAV, then update the only one NAV with the TXOP duration if the TXOP duration is greater than the NAV; and if there is more than one NAV, update a regular NAV of the one or more NAVs with the TXOP duration if the TXOP duration is greater than the regular NAV.

In Example 11, the subject matter of any one or more of Examples 1-10 optionally include where the processing circuitry is further configured to: determine the frame is an inter basic service set (BSS) frame or an unclassified frame; and if a MAC portion of the frame is not decoded, and the one or more NAVs is a regular NAV and an intra-BSS NAV, update the regular NAV with the TXOP duration if the TXOP duration is greater than the regular NAV.

In Example 12, the subject matter of any one or more of Examples 1-11 optionally include where the processing circuitry is further configured to: if the frame is in response to a trigger frame transmitted by the wireless device, ignore the TXOP duration.

In Example 13, the subject matter of any one or more of Examples 1-12 optionally include where the processing circuitry is further configured to: if the preamble portion of the frame comprises a high-efficiency (HE) signal (SIG) A field (HE-SIG-A) including a transmission opportunity (TXOP) duration field and a media access control (MAC) portion of the frame is not decoded or the MAC portion of the frame does not include a MAC duration field, set one or more network allocation vectors (NAVs) based on the TXOP duration field.

In Example 14, the subject matter of any one or more of Examples 1-13 optionally include where the wireless device is one from the following group: an Institute of Electrical and Electronic Engineers (IEEE) 14 is missing parent: 14 is missing parent: 802.11ax access point, an IEEE 802.11ax station, an IEEE 14 is missing parent: 14 is missing parent: 802.11 station, and an IEEE 802.11 access point.

In Example 15, the subject matter of any one or more of Examples 1-14 optionally include transceiver circuitry coupled to the processing circuitry.

Example 16 is a non-transitory computer-readable storage medium that stores instructions for execution by one or more processors, the instructions to configure the one or more processors to cause a wireless device to: decode a preamble portion of a frame; and if the preamble portion of the frame comprises a high-efficiency (HE) signal (SIG) A field (HE-SIG-A) including a transmission opportunity (TXOP) duration field and a media access control (MAC) portion of the frame is not decoded, set one or more network allocation vectors (NAVs) based on the TXOP duration field.

In Example 17, the subject matter of Example 16 optionally includes where the instructions further configure the one or more processors to cause the wireless device to: decode a media access control (MAC) portion of the frame; and if the MAC portion of the frame comprises a MAC duration field, set the one or more network allocation vectors (NAVs) based on the MAC duration field.

In Example 18, the subject matter of any one or more of Examples 16-17 optionally include where the TXOP duration field comprises fewer bits than the MAC duration field.

In Example 19, the subject matter of any one or more of Examples 16-18 optionally include where the instructions further configure the one or more processors to cause the wireless processing to: if a MAC portion of the frame is not decoded, and a basic service set (BSS) color of the frame indicates the frame is an inter-BSS frame, and if there is only one NAV, then update the only one NAV with the TXOP duration if the TXOP duration is greater than the NAV; and if there is more than one NAV, update a regular NAV of the one or more NAVs with the TXOP duration if the TXOP duration is greater than the regular NAV.

Example 20 is a method performed by a wireless device, the method including: decoding a preamble portion of a frame; and if the preamble portion of the frame comprises a high-efficiency (HE) signal (SIG) A field (HE-SIG-A) including a transmission opportunity (TXOP) duration field and a media access control (MAC) portion of the frame is not decoded, setting one or more network allocation vectors (NAVs) based on the TXOP duration field.

In Example 21, the subject matter of Example 20 optionally includes decoding a MAC portion of the frame; and setting the one or more network allocation vectors (NAVs) based on the MAC duration field if the MAC portion of the frame comprises a MAC duration field.

Example 22 is an apparatus of a wireless device including: memory; and processing circuitry coupled to the memory, the processing circuitry configured to: decode a preamble portion of a frame; and if the preamble portion of the frame comprises a high-efficiency (HE) signal (SIG) A field (HE-SIG-A) including a transmission opportunity (TXOP) duration field, set one or more network allocation vectors (NAVs) based on the TXOP duration field.

In Example 23, the subject matter of Example 22 optionally includes transceiver circuitry coupled to the processing circuitry; and, one or more antennas coupled to the transceiver circuitry.

Example 24 is an apparatus of a wireless device, the apparatus including: means for decoding a preamble portion of a frame; and if the preamble portion of the frame comprises a high-efficiency (HE) signal (SIG) A field (HE-SIG-A) including a transmission opportunity (TXOP) duration field, and a media access control (MAC) portion of the frame is not decoded, means for setting one or more network allocation vectors (NAVs) based on the TXOP duration field.

In Example 25, the subject matter of Example 24 optionally includes if the MAC portion of the frame is decoded and the MAC portion comprises a MAC duration field, means for setting the one or more NAVs based on the MAC duration field.

In Example 26, the subject matter of any one or more of Examples 24-25 optionally include where the MAC portion is a physical layer convergence (PLCP) service data unit (PSDU).

In Example 27, the subject matter of any one or more of Examples 25-26 optionally include where the TXOP duration field comprises fewer bits than the MAC duration field.

In Example 28, the subject matter of any one or more of Examples 25-27 optionally include where the frame comprises a receiver address (RA), and further including: means for refraining from setting the one or more NAVs if the RA is equal to a MAC address of the wireless device.

In Example 29, the subject matter of any one or more of Examples 24-28 optionally include if the frame is a trigger frame, and the wireless device is indicated in an information field of the trigger frame, means for refraining from setting the one or more NAVs.

In Example 30, the subject matter of any one or more of Examples 24-29 optionally include if the frame is a multi-user (MU) request-to-send (RTS) frame, and the wireless device is indicated in an information field of the MU-RTS frame, means for refraining from setting the one or more NAVs.

In Example 31, the subject matter of any one or more of Examples 24-30 optionally include if a MAC portion of the frame is not decoded and a basic service set (BSS) color field of the frame indicates the frame is an intra-BSS frame, and if there is only one NAV, then means for updating the only one NAV with the TXOP duration if the TXOP duration is greater than the only one NAV; and if there is more than one NAV, means for updating an intra-BSS NAV of the one or more NAVs with the TXOP duration if the TXOP duration is greater than the intra-BSS NAV.

In Example 32, the subject matter of any one or more of Examples 24-31 optionally include if a MAC portion of the frame is not decoded, and the frame is a not in response to a trigger frame from the wireless device, and if a basic service set (BSS) color of the frame indicates the frame is an intra-BSS frame, and there is only one NAV, means for updating the NAV with the TXOP duration if the TXOP duration is greater than the NAV; and if there is more than one NAV, means for updating an intra-BSS NAV of the one or more NAVs with the TXOP duration if the TXOP duration is greater than the intra-BSS NAV.

In Example 33, the subject matter of any one or more of Examples 24-32 optionally include where the processing circuitry is further configured to: if a MAC portion of the frame is not decoded, and a basic service set (BSS) color of the frame indicates the frame is an inter-BSS frame, and if there is only one NAV, then means for updating the only one NAV with the TXOP duration if the TXOP duration is greater than the NAV; and if there is more than one NAV, means for updating a regular NAV of the one or more NAVs with the TXOP duration if the TXOP duration is greater than the regular NAV.

In Example 34, the subject matter of any one or more of Examples 24-33 optionally include means for determining the frame is an inter basic service set (BSS) frame or an unclassified frame; and if a MAC portion of the frame is not decoded, and the one or more NAVs is a regular NAV and an intra-BSS NAV, means for updating the regular NAV with the TXOP duration if the TXOP duration is greater than the regular NAV.

In Example 35, the subject matter of any one or more of Examples 24-34 optionally include if the frame is in response to a trigger frame transmitted by the wireless device, means for ignoring the TXOP duration.

In Example 36, the subject matter of any one or more of Examples 24-35 optionally include if the preamble portion of the frame comprises a high-efficiency (HE) signal (SIG) A field (HE-SIG-A) including a transmission opportunity (TXOP) duration field and a media access control (MAC) portion of the frame is not decoded or the MAC portion of the frame does not include a MAC duration field, means for setting one or more network allocation vectors (NAVs) based on the TXOP duration field.

In Example 37, the subject matter of any one or more of Examples 24-36 optionally include where the wireless device is one from the following group: an Institute of Electrical and Electronic Engineers (IEEE) 37 is missing parent: 37 is missing parent: 802.11ax access point, an IEEE 802.11ax station, an IEEE 37 is missing parent: 37 is missing parent: 802.11 station, and an IEEE 802.11 access point.

In Example 38, the subject matter of any one or more of Examples 24-37 optionally include means for sending and receiving radio signals.

Example 39 is a method performed by an apparatus of a wireless device, the method including: decoding a preamble portion of a frame; and if the preamble portion of the frame comprises a high-efficiency (HE) signal (SIG) A field (HE-SIG-A) including a transmission opportunity (TXOP) duration field, setting one or more network allocation vectors (NAVs) based on the TXOP duration field.

In Example 40, the subject matter of Example 39 optionally includes if the MAC portion of the frame is decoded and the MAC portion comprises a MAC duration field, setting the one or more NAVs based on the MAC duration field.

Example 41 is a non-transitory computer-readable storage medium that stores instructions for execution by one or more processors, the instructions to configure the one or more processors to cause a wireless device to: decode a preamble portion of a frame; and if the preamble portion of the frame comprises a high-efficiency (HE) signal (SIG) A field (HE-SIG-A) including a transmission opportunity (TXOP) duration field, set one or more network allocation vectors (NAVs) based on the TXOP duration field.

In Example 42, the subject matter of Example 41 optionally includes where the instructions further configure the one or more processors to cause the wireless device to: if the MAC portion of the frame is decoded and the MAC portion comprises a MAC duration field, setting the one or more NAVs based on the MAC duration field.

Example 43 is an apparatus of a wireless device, the apparatus including: means for decoding a preamble portion of a frame; and if the preamble portion of the frame comprises a high-efficiency (HE) signal (SIG) A field (HE-SIG-A) including a transmission opportunity (TXOP) duration field, means for setting one or more network allocation vectors (NAVs) based on the TXOP duration field.

In Example 44, the subject matter of Example 43 optionally includes if the MAC portion of the frame is decoded and the MAC portion comprises a MAC duration field, means for setting the one or more NAVs based on the MAC duration field.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a non-Access Point (non-AP) high-efficiency (HE) station (STA), the apparatus comprising: memory; and processing circuitry coupled to the memory, wherein the processing circuitry configured to:
   maintain a basic network allocation vector (NAV) and an intra-basic service set (BSS) NAV; and
   store the basic NAV and the intra-BSS NAV in the memory,
   wherein to maintain the basic NAV and the intra-BSS NAV, the processing circuitry is configured to:
   update the intra-BSS NAV based on an intra-BSS physical layer (PHY) protocol data unit (PPDU); and
   update the basic NAV based on an inter-BSS PPDU or a PPDU that cannot be classified as intra-BSS or inter-BSS,
   wherein the processing circuitry is further configured to:
   refrain from transmitting a frame while counters associated with both the intra-BSS NAV and the basic NAV are non-zero;
   perform channel access for transmission of the frame when either the counter associated with the intra-BSS NAV or the basic NAV is zero; and
   encode the frame for an uplink orthogonal frequency division multiple-access (OFDMA) transmission.

2. The apparatus of claim 1, wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when the TXOP duration is not unspecified.

3. The apparatus of claim 1, wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when the TXOP duration is greater than a current value of the basic NAV.

4. The apparatus of claim 1 wherein to update the intra-BSS NAV, the processing circuitry is configured to update the intra-BSS NAV with a duration indicated by a duration field of a physical service data unit (PSDU) of an intra-BSS PPDU when the duration indicated by the duration field of the PSDU is greater than a current value of the intra-BSS NAV and a receiver address (RA) of the intra-BSS PPDU is not a media access control (MAC) address of the non-AP HE STA.

5. The apparatus of claim 1, wherein to update the intra-BSS NAV, the processing circuitry is configured to:
update the intra-BSS NAV when the intra-BSS PPDU does not contain a trigger frame; and
refrain from updating the intra-BSS NAV when the intra-BSS PPDU contains a trigger frame.

6. The apparatus of claim 1, wherein to update the intra-BSS NAV, the processing circuitry is configured to:
update the intra-BSS NAV with a duration indicated by a duration field of a physical service data unit (PSDU) of the intra-BSS PPDU when the PSDU does not contain a frame that solicits an immediate response; and
refrain from updating the intra-BSS NAV when the PSDU contains a frame that solicits an immediate response.

7. The apparatus of claim 1 wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when a duration field of a physical service data unit (PSDU) of the inter-BSS PPDU or the PPDU that cannot be classified does not include duration information.

8. The apparatus of claim 1 further comprising: transceiver circuitry coupled to two or more antennas, wherein for transmission of the frame, the processing circuitry is configured to encode the frame for the uplink OFDMA transmission using the two or more antennas.

9. A non-transitory computer-readable storage medium that stores instructions for execution by processing circuitry of an apparatus of a non-Access Point (non-AP) high-efficiency (HE) station (STA), wherein the instructions configure the processing circuitry to:
maintain a basic network allocation vector (NAV) and an intra-basic service set (BSS) NAV; and
store the basic NAV and the intra-BSS NAV in memory, wherein to maintain the basic NAV and the intra-BSS NAV, the processing circuitry is configured to:
update the intra-BSS NAV based on an intra-BSS physical layer (PHY) protocol data unit (PPDU); and
update the basic NAV based on an inter-BSS PPDU or a PPDU that cannot be classified as intra-BSS or inter-BSS,
wherein the processing circuitry is further configured to:
refrain from transmitting a frame while counters associated with both the intra-BSS NAV and the basic NAV are non-zero;
perform channel access for transmission of the frame when either the counter associated with the intra-BSS NAV or the basic NAV is zero; and
encode the frame for an uplink orthogonal frequency division multiple-access (OFDMA) transmission.

10. The non-transitory computer-readable storage medium of claim 9, wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when the TXOP duration is not unspecified.

11. The non-transitory computer-readable storage medium of claim 9, wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when the TXOP duration is greater than a current value of the basic NAV.

12. The non-transitory computer-readable storage medium of claim 9 wherein to update the intra-BSS NAV, the processing circuitry is configured to update the intra-BSS NAV with a duration indicated by a duration field of a physical service data unit (PSDU) of an intra-BSS PPDU when the duration indicated by the duration field of the PSDU is greater than a current value of the intra-BSS NAV and a receiver address (RA) of the intra-BSS PPDU is not a media access control (MAC) address of the non-AP HE STA.

13. The non-transitory computer-readable storage medium of claim 9, wherein to update the intra-BSS NAV, the processing circuitry is configured to:
update the intra-BSS NAV when the intra-BSS PPDU does not contain a trigger frame; and
refrain from updating the intra-BSS NAV when the intra-BSS PPDU contains a trigger frame.

14. The non-transitory computer-readable storage medium of claim 9, wherein to update the intra-BSS NAV, the processing circuitry is configured to:
update the intra-BSS NAV with a duration indicated by a duration field of a physical service data unit (PSDU) of the intra-BSS PPDU when the PSDU does not contain a frame that solicits an immediate response; and
refrain from updating the intra-BSS NAV when the PSDU contains a frame that solicits an immediate response.

15. The non-transitory computer-readable storage medium of claim 9 wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when a duration field of a physical service data unit (PSDU) of the inter-BSS PPDU or the PPDU that cannot be classified does not include duration information.

16. A wireless communication device configured for operation in a wireless local area network (WLAN), the device comprising:
processing circuitry and associated memory;
transceiver circuitry; and
two or more antennas coupled to the transceiver circuitry,
wherein when the wireless communication device is configured to operate as a non-Access Point (non-AP) high-efficiency (HE) station (STA), the processing circuitry is configured to:
maintain a basic network allocation vector (NAV) and an intra-basic service set (BSS) NAV; and
store counters associated with the basic NAV and the intra-BSS NAV in the associated memory,
wherein to maintain the basic NAV and the intra-BSS NAV, the processing circuitry is configured to:
update the intra-BSS NAV based on an intra-BSS physical layer (PHY) protocol data unit (PPDU); and
update the basic NAV based on an inter-BSS PPDU or a PPDU that cannot be classified as intra-BSS or inter-BSS, and
wherein the processing circuitry is further configured to:
cause the transceiver circuitry to refrain from transmitting a frame while the counters associated with both the intra-BSS NAV and the basic NAV are non-zero; and configure the transceiver circuitry to perform channel access for transmission of a frame when either the counter associated with the intra-BSS NAV or the basic NAV is zero; and encode the frame for an uplink orthogonal frequency division multiple-access (OFDMA) transmission by the transceiver circuitry using the two or more antennas.

17. The device of claim 16, wherein to update the basic NAV, the processing circuitry is configured to update the basic NAV with a transmission opportunity (TXOP) duration indicated in an HE signal (SIG) A (HE-SIG-A) field of an inter-BSS PPDU or of a PPDU that cannot be classified as intra-BSS PPDU or inter-BSS PPDU, when the TXOP duration is greater than a current value of the basic NAV.

18. The apparatus of claim 17 wherein to update the intra-BSS NAV, the processing circuitry is configured to:

update the intra-BSS NAV with a duration indicated by a duration field of a physical service data unit (PSDU) of an intra-BSS PPDU when the duration indicated by the duration field of the PSDU is greater than a current value of the intra-BSS NAV and a receiver address (RA) of the intra-BSS PPDU is not a media access control (MAC) address of the non-AP HE STA, unless the intra-BSS PPDU contains a trigger frame.

\* \* \* \* \*

UNITED STATES PATENT AND TRADEMARK OFFICE
CERTIFICATE OF CORRECTION

PATENT NO. : 11,357,048 B2
APPLICATION NO. : 16/835951
DATED : June 7, 2022
INVENTOR(S) : Huang et al.

Page 1 of 1

It is certified that error appears in the above-identified patent and that said Letters Patent is hereby corrected as shown below:

In the Claims

In Column 21, Line 15, in Claim 18, delete "apparatus" and insert --device-- therefor Signed and Sealed this
Tenth Day of January, 2023

Katherine Kelly Vidal
*Director of the United States Patent and Trademark Office*